(12) United States Patent
Kubo et al.

(10) Patent No.: US 8,208,171 B2
(45) Date of Patent: *Jun. 26, 2012

(54) IMAGE READING APPARATUS AND METHOD TO PREVENT IMAGE ERASING DUE TO ERRONEOUSLY LINE-SHAPED NOISE DETECTION

(75) Inventors: Hiroaki Kubo, Muko (JP); Nobuhiro Mishima, Osaka (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 723 days.

This patent is subject to a terminal disclaimer.

(21) Appl. No.: 12/332,176

(22) Filed: Dec. 10, 2008

(65) Prior Publication Data
US 2009/0244663 A1 Oct. 1, 2009

(30) Foreign Application Priority Data

Mar. 28, 2008 (JP) ................................. 2008-087847

(51) Int. Cl.
*G06F 15/00* (2006.01)
*G06K 9/34* (2006.01)

(52) U.S. Cl. ...... 358/1.9; 358/3.01; 358/3.02; 358/3.09; 358/3.11; 358/3.12; 358/3.22; 358/3.23; 358/3.24; 358/3.26; 358/3.31; 358/512; 358/513; 358/501; 358/505; 358/447; 358/448; 358/463; 358/474; 358/486; 358/496; 358/497; 382/112; 382/162; 382/163; 382/164; 382/165; 382/166; 382/169; 382/170; 382/171; 382/172; 382/175; 382/176; 382/177; 382/178; 382/179; 382/180; 382/255; 382/256; 382/258; 382/260; 382/263; 382/264; 382/267; 382/268; 382/274; 382/275; 399/16; 399/17; 399/18; 399/29; 399/31; 399/39; 399/40; 399/47; 399/48; 399/53; 399/178; 399/198; 399/205; 399/211; 399/344

(58) Field of Classification Search ........................ None
See application file for complete search history.

(56) References Cited

U.S. PATENT DOCUMENTS 5,467,145 A 11/1995 Limberg
(Continued)

FOREIGN PATENT DOCUMENTS

JP 2000-78409 3/2000
(Continued)

OTHER PUBLICATIONS

Japanese Notification of Reasons for Refusal mailed on Mar. 30, 2010, directed to corresponding Japanese Patent Application No. 2008-087847; 11 pages.

(Continued)

*Primary Examiner* — David K. Moore
*Assistant Examiner* — Steven Kau
(74) *Attorney, Agent, or Firm* — Morrison & Foerster LLP

(57) ABSTRACT

The present invention aims to prevent a problem that an image on a document sheet is erased due to misdetection of a line-shaped noise. A copy machine 1 compares RGB values of a target pixel with averaged RGB values (Step S103). If only one of the RGB values has a difference that is greater than a prescribed value Ref2 (Step S103: YES), the copy machine 1 extracts the target pixel as a line-shaped noise pixel, and moves to a line-shaped noise correction (Step S108) while holding the address of the target pixel in a line-shaped noise address storing area 49b. If two of the RGB values have differences (Step S103: NO, Step S104: YES) and a difference between these two of the RGB values is no greater than a prescribed value Ref3 (Step S105: YES), the copy machine 1 extracts the target pixel as a line-shaped noise pixel, and moves to the line-shaped noise correction (Step S108) while holding the address of the target pixel in the line-shaped noise address storing area 49b.

8 Claims, 12 Drawing Sheets

U.S. PATENT DOCUMENTS

| | | |
|---|---|---|
| 6,559,886 B1 | 5/2003 | Miyahara |
| 7,433,537 B2 | 10/2008 | Sasada |
| 7,440,639 B2 | 10/2008 | Ishiguro et al. |
| 7,660,018 B2 * | 2/2010 | Shimizu ............... 358/3.26 |
| 2005/0083543 A1 | 4/2005 | Suzuki et al. |
| 2005/0185224 A1 * | 8/2005 | Yoshizawa ............ 358/3.26 |
| 2006/0066918 A1 | 3/2006 | Ishiguro et al. |
| 2006/0066919 A1 | 3/2006 | Saka et al. |
| 2007/0097443 A1 * | 5/2007 | Ishiguro et al. ....... 358/3.26 |
| 2007/0109605 A1 | 5/2007 | Shimizu |
| 2009/0244662 A1 | 10/2009 | Kubo et al. |

FOREIGN PATENT DOCUMENTS

| | | |
|---|---|---|
| JP | 2002-271631 | 9/2002 |
| JP | 2003-8846 | 1/2003 |
| JP | 2004-297302 | 10/2004 |
| JP | 2005-94685 | 4/2005 |
| JP | 2005-117090 | 4/2005 |
| JP | 2005-124075 | 5/2005 |
| JP | 2006-101300 | 4/2006 |
| JP | 2007-129460 | 5/2007 |
| JP | 2007-158782 | 6/2007 |
| JP | 2008-28684 | 2/2008 |
| JP | 2008-59406 | 3/2008 |

OTHER PUBLICATIONS

Kubo, H. et al., U.S. Office Action mailed Sep. 1, 2011, directed to U.S. Appl. No. 12/332,003; 23 pages.

Japanese Notification of Reasons for Refusal mailed Mar. 30, 2010, directed to Japanese Application No. 2008-087848; 6 pages.

Kubo et al., U.S. Office Action mailed Mar. 13, 2012, directed to U.S. Appl. No. 12/332,003; 14 pages.

* cited by examiner

FIG.6A
FIG.6B
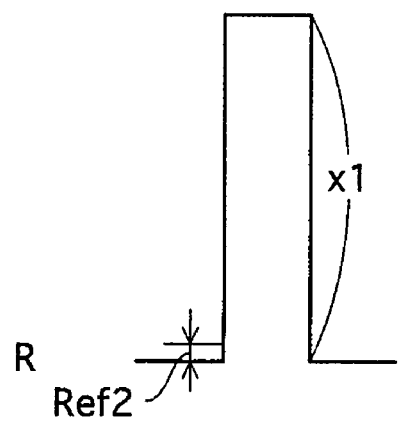
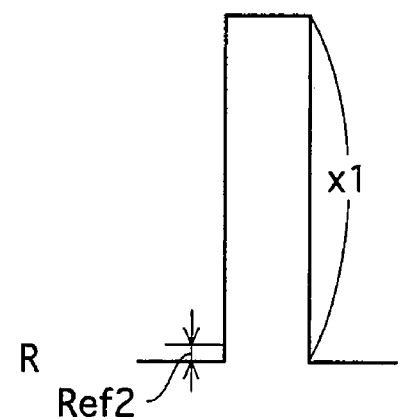
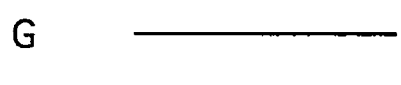
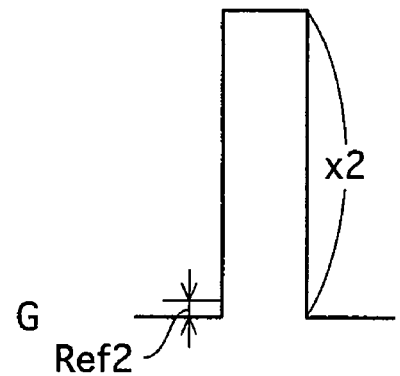
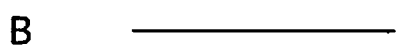
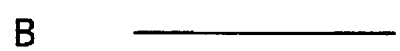

DOCUMENT FEEDING DIRECTION

MAGENTA (255,0,255)

WHITE (255,255,255)

IMAGE READING APPARATUS AND METHOD TO PREVENT IMAGE ERASING DUE TO ERRONEOUSLY LINE-SHAPED NOISE DETECTION

CROSS-REFERENCE TO RELATED APPLICATION

This application is based on an application No. 2008-087847 filed on Mar. 28, 2008 in Japan, the contents of which is hereby incorporated by reference.

BACKGROUND OF THE INVENTION (1) Field of the Invention

The present invention relates to an image reading apparatus, and particularly to an image reading apparatus that reads an image from a document sheet while carrying the document sheet over a scanner unit thereof.

(2) Description of the Related Art

A method called the "sheet-through method" has been conventionally used by image reading apparatuses, which are generally provided in, for example, scanners, MFPs (Multi Function Peripherals), copy machines and fax machines. Unlike the "platen-set method", which carries a scanner unit along a document sheet fixed at a scanning area, the "sheet-through method" carries a document sheet over the scanner unit fixed at the scanning area to scan an image from the document sheet.

By the way, if a foreign object such as dirt and dust is attached to part of the scanning area, the scanner unit might scan the foreign object as well when scanning the document sheet. This results in a noise on the scanned image. In the case of the "platen-set method", the scanner unit moves away from the foreign object as scanning the document sheet. Accordingly, in many cases, the foreign object causes only a small noise. However, in the case of the "sheet-through method", the scanner unit keeps scanning the foreign object while the document sheet is being conveyed, because the scanner unit does not move. As a result, this sometimes causes a large noise called "a line-shaped noise".

Usually, the scanner unit includes a CCD or a CMOS, which has a plurality of elements consisted of RGB channels for reading RGB color components respectively. For example, a foreign object attached to the G channel causes a green line-shaped noise extending in the feeding direction of the document sheet.

To solve this problem, techniques for detecting and removing a series of pixels that is appear to be line-shaped noises have been invented (For example, see Japanese laid-open Patent Application Publications No. 2003-8846, No. 2004-297302, No. 2005-124075 and No. 2007-129460). According to these techniques, the RGB color components of a detected noise are corrected according to the RGB color components of pixels surrounding the noise (hereinafter called "the surrounding pixels").

However, in these techniques, if a table or the like is illustrated on a document sheet, a straight line extending in the feeding direction of the document sheet is read, and the line is misdetected as a line-shaped noise. As a result, the line will be corrected based on the pixels in the surrounding pixels, and the original image on the document sheet might be destroyed.

SUMMARY OF THE INVENTION

The object of the present invention is to provide an image reading apparatus that is capable of avoiding such problems as not detecting line-shaped noises or erasing images on the document sheet by erroneously detecting line-shaped noises.

The Applicant found that if a line-shaped noise is caused by a foreign object attached to any of the RGB channels of the scanner unit, only the value of the RGB color component of the line-shaped noise, corresponding to the channel to which the foreign object is attached, is different from that of the surrounding pixels thereof, and the values of the rest of the RGB color components are the same as the surrounding pixels in many cases. This is because, in many cases, pixels on which the line-shaped noise is caused have a color that is the same as the color of the surrounding pixels. For example, if a foreign object is attached to one of the RGB channels, only the value of the RGB color component of the line-shaped noise corresponding to this channel is different from that of the surrounding pixels, and the other two are the same. If a foreign object is attached to two of the RGB channels, the values of the two RGB color components of the line-shaped noise corresponding to the channels are different from those of the surrounding pixels.

In view of this, a first image reading apparatus pertaining to the present invention is an image reading apparatus comprising: a reader operable to read an image formed on a sheet to acquire RGB values of pixels that constitute the image, by using a sheet-through method; an extractor operable to compare an RGB value of each target pixel in the image with an RGB value of a neighboring pixel thereof to judge whether a difference therebetween is no less than a prescribed threshold, and extract the target pixel as a line-shaped noise candidate pixel if the difference is no less than the prescribed threshold and the target pixel constitutes a series of line-shaped noise candidate pixels extending in a feeding direction of the sheet; a determiner operable to calculate differences between the R, G and B components included in the RGB value of the line-shaped noise candidate pixel and R, G and B components included in an RGB value of each of surrounding pixels included in a surrounding area of the line-shaped noise candidate pixel respectively, and determine the line-shaped noise candidate pixel as a line-shaped noise pixel if (i) only one of the components has a difference that is no less than a prescribed value, or (ii) two of the components have substantially a same difference that is no less than a prescribed value; and a corrector operable to correct the RGB value of the line-shaped noise pixel based on an RGB value of at least one of surrounding pixels included in a surrounding area of the line-shaped noise pixel.

A second image reading apparatus pertaining to the present invention is an image reading apparatus comprising: a reader operable to read an image formed on a sheet to acquire RGB values of pixels that constitute the image, by using a sheet-through method; an extractor operable to compare an RGB value of each target pixel in the image with an RGB value of a neighboring pixel thereof to judge whether a difference therebetween is no less than a prescribed threshold, and extract the target pixel as a line-shaped noise pixel if the difference is no less than the prescribed threshold and the target pixel constitutes a series of line-shaped noise pixels extending in a feeding direction of the sheet; a corrector operable to defines a plurality of blocks throughout a surrounding area of the line-shaped noise pixel by averaging R, G and B components among each prescribed number of pixels included in the surrounding area, extracts one of the blocks whose non-noise color component has a smallest difference from a non-noise color component of the line-shaped noise pixel, and corrects the RGB value of the line-shaped noise pixel by replacing with an RGB value of the extracted one of the blocks, where the non-noise color component is any component of the RGB value of the line-shaped noise pixel other than a noise color component, and the noise color component is a component that has the difference that is no less than the prescribed threshold; and a correction prohibiter operable to extract, from RGB components of all the surrounding pixels, a minimum and a maximum of the noise color component, calculate a difference therebetween as a displacement of the noise color component among the surrounding pixels, extract a minimum and a maximum of the non-noise color component, and calculate a difference therebetween as a displacement of the non-noise color component among the surrounding pixels, and extract, from RGB values of all the blocks, a minimum and a maximum of the noise color component and calculate a difference therebetween as a displacement of the noise color component among the blocks, extract a minimum and a maximum of the non-noise color component, and calculate a difference therebetween as a displacement of the non-noise color component among the blocks, and prohibit the correction if the displacement of the noise color component is greater than a first reference value and the displacement of the non-noise color component is not greater than a second reference value with respect to either the surrounding pixels or the blocks.

A first image reading method pertaining to the present invention is an image reading method comprising: a reading step of reading an image formed on a sheet to acquire RGB values of pixels that constitute the image, by using a sheet-through method; an extracting step of comparing an RGB value of each target pixel in the image with an RGB value of a neighboring pixel thereof to judge whether a difference therebetween is no less than a prescribed threshold, and extracting the target pixel as a line-shaped noise candidate pixel if the difference is no less than the prescribed threshold and the target pixel constitutes a series of line-shaped noise candidate pixels extending in a feeding direction of the sheet; a determining step of calculating differences between the R, G and B components included in the RGB value of the line-shaped noise candidate pixel and R, G and B components included in an RGB value of each of surrounding pixels included in a surrounding area of the line-shaped noise candidate pixel respectively, and determining the line-shaped noise candidate pixel as a line-shaped noise pixel if (i) only one of the components has a difference that is no less than a prescribed value, or (ii) two of the components have substantially a same difference that is no less than a prescribed value; and a correcting step of correcting the RGB value of the line-shaped noise pixel based on an RGB value of at least one of surrounding pixels included in a surrounding area of the line-shaped noise pixel.

A second image reading method pertaining to the present invention is an image reading method comprising: a reading step of reading an image formed on a sheet to acquire RGB values of pixels that constitute the image, by using a sheet-through method; an extracting step of comparing an RGB value of each target pixel in the image with an RGB value of a neighboring pixel thereof to judge whether a difference therebetween is no less than a prescribed threshold, and extracting the target pixel as a line-shaped noise pixel if the difference is no less than the prescribed threshold and the target pixel constitutes a series of line-shaped noise pixels extending in a feeding direction of the sheet; a correcting step of defining a plurality of blocks throughout a surrounding area of the line-shaped noise pixel by averaging R, G and B components among each prescribed number of pixels included in the surrounding area, extracting one of the blocks whose non-noise color component has a smallest difference from a non-noise color component of the line-shaped noise pixel, and correcting the RGB value of the line-shaped noise pixel by replacing with an RGB value of the extracted one of the blocks, where the non-noise color component is any component of the RGB value of the line-shaped noise pixel other than a noise color component, and the noise color component is a component that has the difference that is no less than the prescribed threshold; and a correction prohibiting step of extracting, from RGB components of all the surrounding pixels, a minimum and a maximum of the noise color component, calculating a difference therebetween as a displacement of the noise color component among the surrounding pixels, extracting a minimum and a maximum of the non-noise color component, and calculating a difference therebetween as a displacement of the non-noise color component among the surrounding pixels, and extracting, from RGB values of all the blocks, a minimum and a maximum of the noise color component and calculating a difference therebetween as a displacement of the noise color component among the blocks, extracting a minimum and a maximum of the non-noise color component, and calculating a difference therebetween as a displacement of the non-noise color component among the blocks, and prohibiting the correction if the displacement of the noise color component is greater than a first reference value and the displacement of the non-noise color component is not greater than a second reference value with respect to either the surrounding pixels or the blocks.

With the stated structure, the first image reading apparatus pertaining to the present invention regards only pixels that should originally have the same color as the surrounding pixels as the line-shaped noise, and does not regard other pixels as the line-shaped noise because it is highly possible that they are pixels of a straight line that constituting a character, a table, and so on. As a result, it is possible to prevent misdetection of line-shaped noise and the problem that an image on the document sheet is erased by the misdetection.

Also, according to the second image reading apparatus pertaining to the present invention, if the noise color components of the blocks included in the surrounding area for correcting the line-shaped noise pixels have large differences and the non-noise components have only small differences, the image reading apparatus prohibits to correct the RGB values of the line-shaped noise based on the RGB values of the blocks. This is because, in such a case, there are possibilities that a block having a different color is inappropriately selected for the correction, and the color of the line-shaped noise pixels are changed to a significantly different color. As a result, even if a long straight line constituting a character, a table, and so on is misdetected as a line-shaped noise pixel, it is possible to prevent the problem that an image on the document sheet is erased by the correction of the line-shaped noise.

In the first image reading apparatus, the extractor may perform edge detection in advance, and extract the line-shaped noise candidate pixel from pixels specified based on an edge that has been detected through the edge detection.

With the stated structure, the image reading apparatus can extract line-shaped noise pixels after performing the edge detection. Accordingly, it is possible to lower the possibility that edges that do not form the line-shaped noise are detected mistakenly.

In the first image reading apparatus, the corrector may define a plurality of blocks throughout the surrounding area of the line-shaped noise pixel by averaging R, G and B components among each prescribed number of pixels included in the surrounding area of the line-shaped noise pixel, extract one of the blocks whose non-noise color component has a smallest difference from a non-noise color component of the line-shaped noise pixel, and correct the RGB value of the line-shaped noise pixel by replacing with an RGB value of the extracted one of the blocks, where the non-noise color component is any component of the RGB value of the line-shaped noise pixel other than a noise color component, and the noise color component is a component that has the difference that is no less than the prescribed threshold.

With the stated structure, the image reading apparatus corrects the RGB color components of the line-shaped noise pixels in units of blocks included in the surrounding areas, in which the RGB color components are averaged. This enables smooth correction.

In the first image reading apparatus, from RGB values of all the surrounding pixels included in the surrounding area of the line-shaped noise pixel, the corrector may extract a minimum and a maximum of the noise color component and calculate a difference therebetween as a displacement of the noise color component among the surrounding pixels included in the surrounding area of the line-shaped noise pixel, and extract a minimum and a maximum of the non-noise color component and calculate a difference therebetween as a displacement of the non-noise color component among the surrounding pixels included in the surrounding area of the line-shaped noise pixel, from RGB values of all the blocks, the corrector may extract a minimum and a maximum of the noise color component and calculate a difference therebetween as a displacement of the noise color component among the blocks, and extract a minimum and a maximum of the non-noise color component and calculate a difference therebetween as a displacement of the non-noise color component among the blocks, and the corrector may prohibit the correction if the displacement of the noise color component is greater than a first reference value and the displacement of the non-noise color component is not greater than a second reference value with respect to either the blocks or the surrounding pixels included in the surrounding area of the line-shaped noise pixel.

With the stated structure, if the noise color components of the blocks included in the surrounding area for correcting the line-shaped noise pixels have large differences and the non-noise components have only small differences, the image reading apparatus prohibits to correct the RGB values of the line-shaped noise based on the RGB values of the blocks. This is because, in such a case, there are possibilities that a block having a different color is inappropriately selected for the correction, and the color of the line-shaped noise pixels are changed to a significantly different color. As a result, even if a long straight line constituting a character, a table, and so on is misdetected as a line-shaped noise pixel, it is possible to prevent the problem that an image on the document sheet is erased by the correction of the line-shaped noise.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 6A and FIG. 6B show differences between RGB color components of a target pixel and RGB color components of surrounding pixels;

DESCRIPTION OF THE PREFERRED EMBODIMENT

In the following explanations, a case where the image reading apparatus pertaining to the present invention is applied to a digital color copy machine (hereinafter simply referred to as "a copy machine") is taken as an example.

Figure 1:
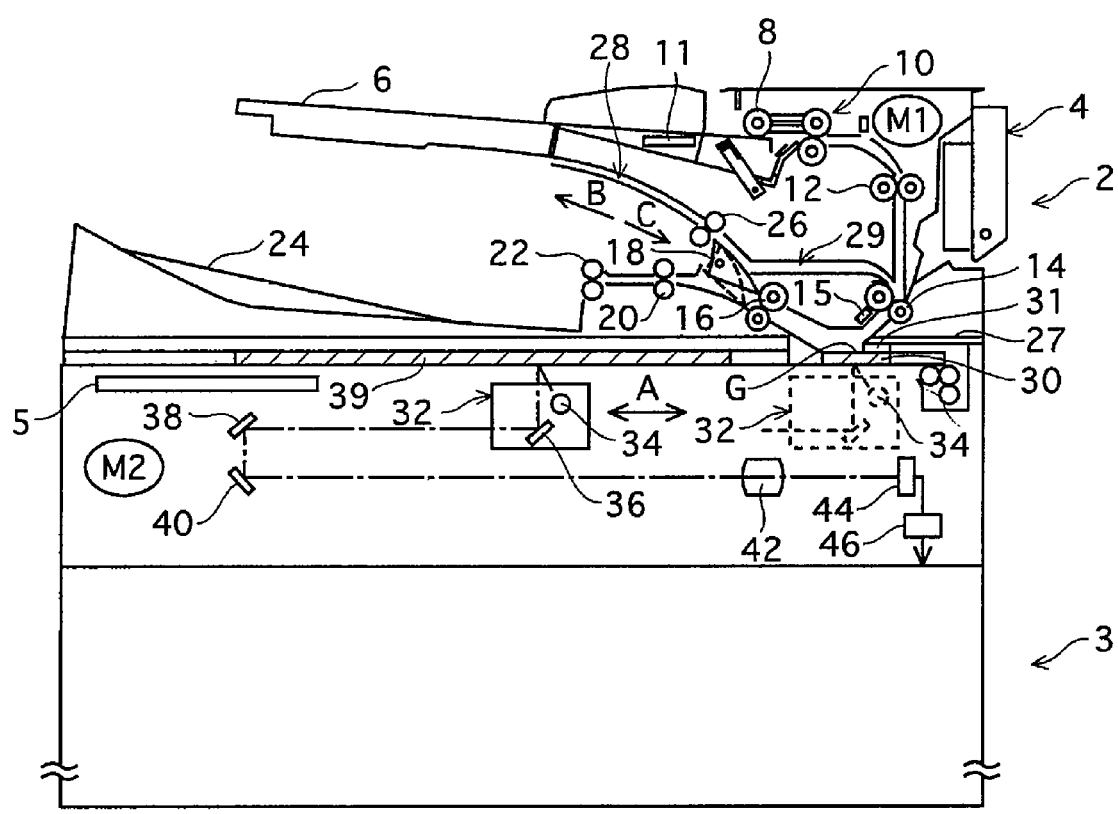
FIG. 1 schematically shows the structure of a copy machine 1 pertaining to an embodiment of the present invention.

FIG. 1 schematically shows the structure of a copy machine 1.

As FIG. 1 shows, the copy machine 1 basically consists of a scanner unit 2 as an image reading apparatus for reading images on a document sheet, and a printer unit 3 for printing the read images on a recording sheet to duplicate the images.

The scanner unit 2 is structured such that the sheet-through method as one of fixed optical systems and the platen-set method as one of movable optical systems are both available for scanning images. Here, the sheet-through method is a method for scanning images while moving a document sheet in the state where the optical system is stopped (fixed). The platen-set method is a-method for scanning images while moving a mirror for reflecting light from the document sheet surface to the CCD sensor in the state where the document sheet is fixed. Here, the light path length from the document scanning area to the CCD sensor is constant.

The scanner unit 2 is equipped with a document feeder 4 for enabling the sheet-through method. The document feeder 4 is for carrying document sheets in a document input tray 6 one by one to a document output tray 24 via a scanning area G on a platen glass 30 as a translucent member. In other words, the document feeder 4 serves as means for conveying document sheets. Here, it is assumed that the copy machine 1 is capable of switching between two modes, namely a single scan mode for scanning only a single side of each document sheet, and a double scanning mode for reversing document sheets and sequentially scanning both sides (the front face and the reverse side) of each document sheet.

In the single scan mode, the uppermost sheet among the document sheets in the document input tray 6 is separated from the document sheets by a pick up roller 8 and a separation roller 10 and conveyed to a resist roller pair 14 via a first intermediate roller pair 12. The sheet's skew is corrected here, and the sheet is next conveyed to the platen glass 30 by the resist roller pair 14. The images on the document sheet are scanned while the document sheet is being moved through the scanning area G on the sheet-through platen glass 30. The document sheet that has passed over the platen glass 30 is conveyed to an ejection roller pair 22 by a second intermediate roller pair 16 and a third immediate roller pair 20, and ejected to the document output tray 24 by the ejection roller 22.

On the other hand, in the double scan mode, a switching hook 18 is moved to the position illustrated in dashed line in FIG. 1 before scanning of the front face of a document sheet. Upon scanning of the front face, the document sheet is conveyed from the second intermediate roller pair 16 to a fourth intermediate roller pair 26 via the switching hook 18, and conveyed on a paper path 28 by the fourth intermediate roller pair 26 in the direction indicated by an arrow B. When the vicinity of the rear end of the document sheet reaches the fourth intermediate roller pair 26, the fourth intermediate roller pair 26 rotates in the opposite direction, and the switching hook 18 is moved to the position illustrated in full line in FIG. 1.

As a result, the document sheet, whose front face has been scanned, moves back on the paper path 26 in the direction indicated by an arrow C. The document sheet is conveyed to a paper path 29 via the switching hook 18 with the above-mentioned rear end in the lead, and conveyed to the resist roller pair 14 again. Then, the document sheet is conveyed to the platen glass 30 by the resist roller pair 14. At this moment, the reverse side of the document sheet faces the front face of the platen glass 30. The reverse side of the document sheet is scanned while the document sheet is being moved through the scanning area G. After that, the document sheet is ejected to the document output tray 24 via the second intermediate roller pair 16, the third intermediate roller pair 20 and the ejection roller 22.

Each of the rollers described above is driven and rotated by a motor M1 via a power transmission mechanism and so on (not illustrated). Also, a document resist sensor 15 is provided at a position downstream the resist roller pair 14 in terms of the feeding direction of the document sheet. The document resist sensor 15 detects the front end and the rear end of each of conveyed document sheets. Further, a document size detection sensor 11 is provided on the document input tray 6. The document size detection sensor 11 detects a size of a document sheet that has been set in the document input tray 6.

The document sheet that passes over the sheet-through platen glass 30 is irradiated by a light source 34 of a scanner 32 that remains stationary under the platen glass 30. The path of the light reflected from the document sheet surface is changed by a first mirror 36, a second mirror 38 and a third mirror 40. A condenser lens 42, which receives the light, forms an image on a CCD sensor 44. The CCD sensor 44 performs photoelectric conversion to generate image signals. As a result, image data that shows RGB color components is generated from the image signals. The generated image data is subjected to image processing performed by a control unit 46, and sent to the printer unit 3.

The printer unit 3 is an image formation apparatus that is based on a well-known electrophotographic system. The printer unit 3 forms (prints) document images on a recording sheet, based on the image data received from the control unit 46.

In addition to the sheet-through platen glass 30, the copy machine 1 is equipped with a platen glass 39 for manual setting. As described above, when scanning a document sheet by the sheet-through method, the scanner 32 is moved to the position under the sheet-through platen glass 30 as illustrated in dashed line, and at this position, irradiates the document sheet conveyed by the document feeder 4, to scan images on the document sheet.

On the other hand, when scanning a document sheet manually placed on the manual-setting platen glass 39 (i.e. when scanning the document sheet by the platen-set method), the document feeder 4 is opened upward, and the document sheet is placed on the manual-setting platen glass 39.

In the state where the document sheet is placed, the scanner 32 is moved in the directions indicated by an arrow A shown in FIG. 1. In this regard, the second mirror 38 and the third mirror 40 move as a pair in the same direction as the scanner 32 at half the speed as the scanner 32. As a result, the distance (light path length) between the document sheet surface and the condenser lens 42 is always kept constant, and the light reflected from the document sheet forms an image on the light-reception surface of the CCD sensor 44. Note that the scanner 32, the second mirror 38, and the third mirror 40 are driven by a motor M2 via a power transmission mechanism and soon (not illustrated).

Also, an operation panel 5 is provided on the top face of the copy machine 1 at a position where user scan easily operate. The operation panel 5 includes a numeric keypad for setting a number of copies, and keys for switching between the double scanning mode and the single scanning mode and between high-resolution scanning and low-resolution scanning, and so on. Also, a key for switching between an unmixed-loading mode and a mixed-loading mode is provided. The unmixed-loading mode is for feeding and scanning document sheets one by one from a document stack consisted of only one size. The mixed-loading mode is for feeding and scanning document sheets one by one from a document stack consisted of different sizes, such as A3 sheets (in the portrait orientation) and A4 sheets (in the landscape orientation). The user can switch between the modes by pressing each of the keys.

Figure 2:
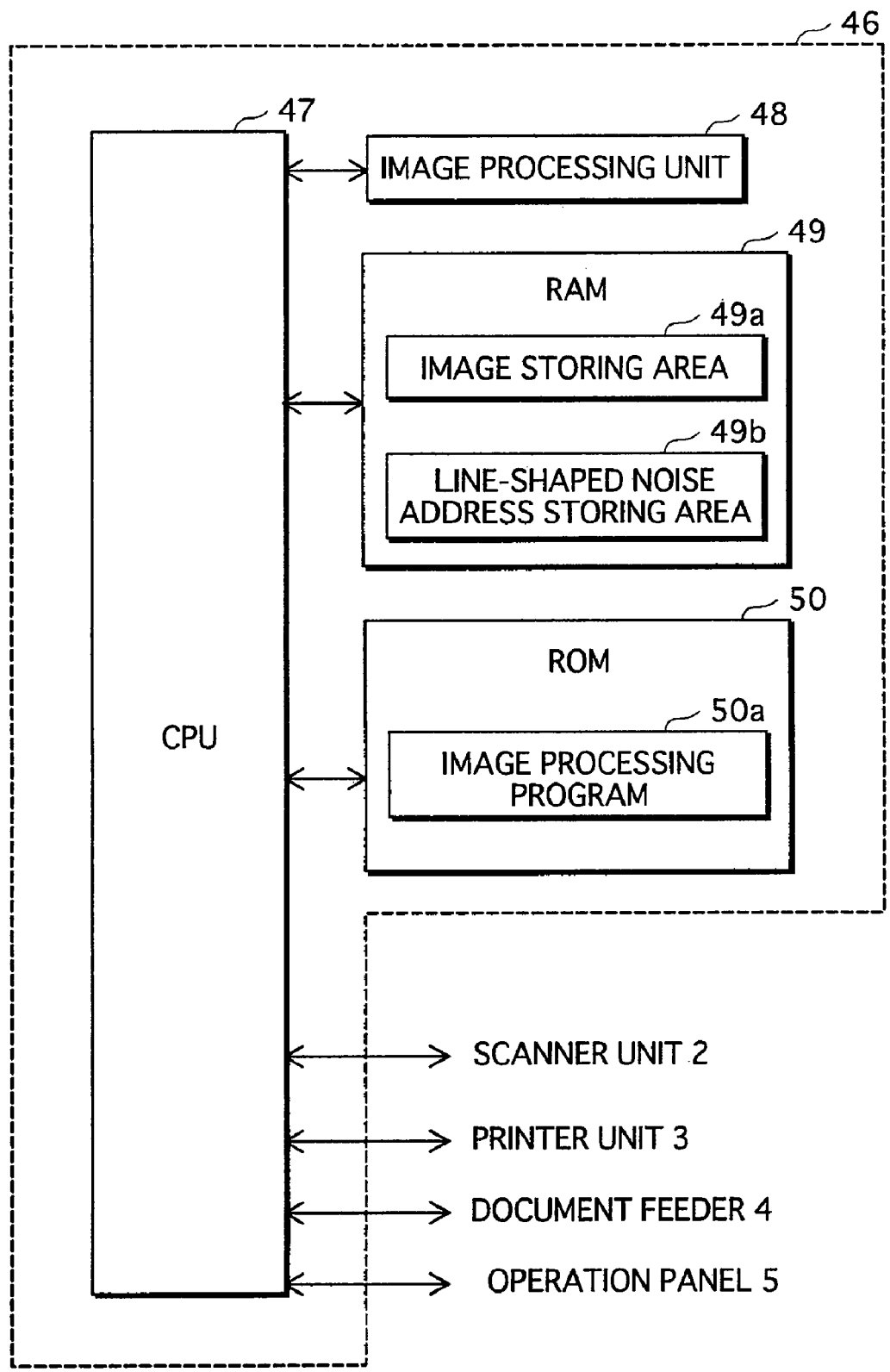
FIG. 2 is a block diagram showing the structure of a control unit 46 of the copy machine 1.

FIG. 2 is a block diagram showing the structure of the control unit 46.

As FIG. 2 shows, the control unit 46 mainly includes a CPU (Central Processing Unit) 47, an image processing unit 48, a RAM (Random Access Memory) 49, and a ROM (Read Only Memory) 50.

The image processing unit 48 processes the image data received from the CCD sensor 44 as described later, and stores the processed image data in an image storing area 49a of the RAM 49. The image data stored in the image storing area 49a is read out at printing such as copying.

The RAM 49 is a rewritable memory, and stores, for example, data required for the scanner unit 2 to perform processing. In particular, the RAM 49 includes an image storing area 49a and a line-shaped noise address storing area 49b. The image storing area 49a is for storing image data generated by the scanner unit 2. The line-shaped noise address storing area 49b is for storing addresses of the line-shaped noise pixels used at line-shaped noise detection performed by the scanner unit 2 as described later.

The ROM 50 is a non-rewritable memory, and stores image processing program 50a for controlling the image processing unit 48.

2. Image Processing

Figure 3:
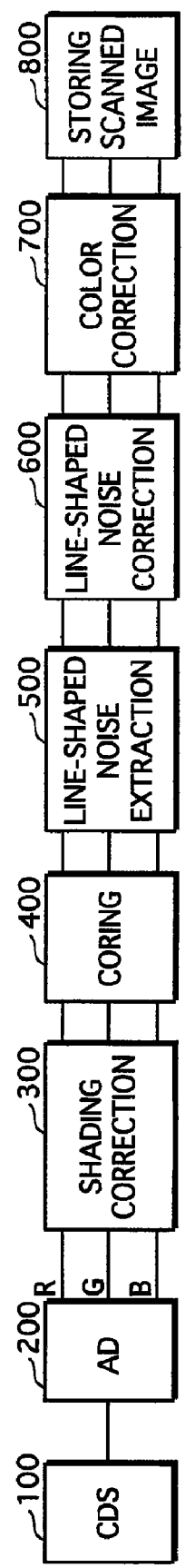
FIG. 3 is a functional block diagram pertaining to image scanning and image processing.
Figure 4:
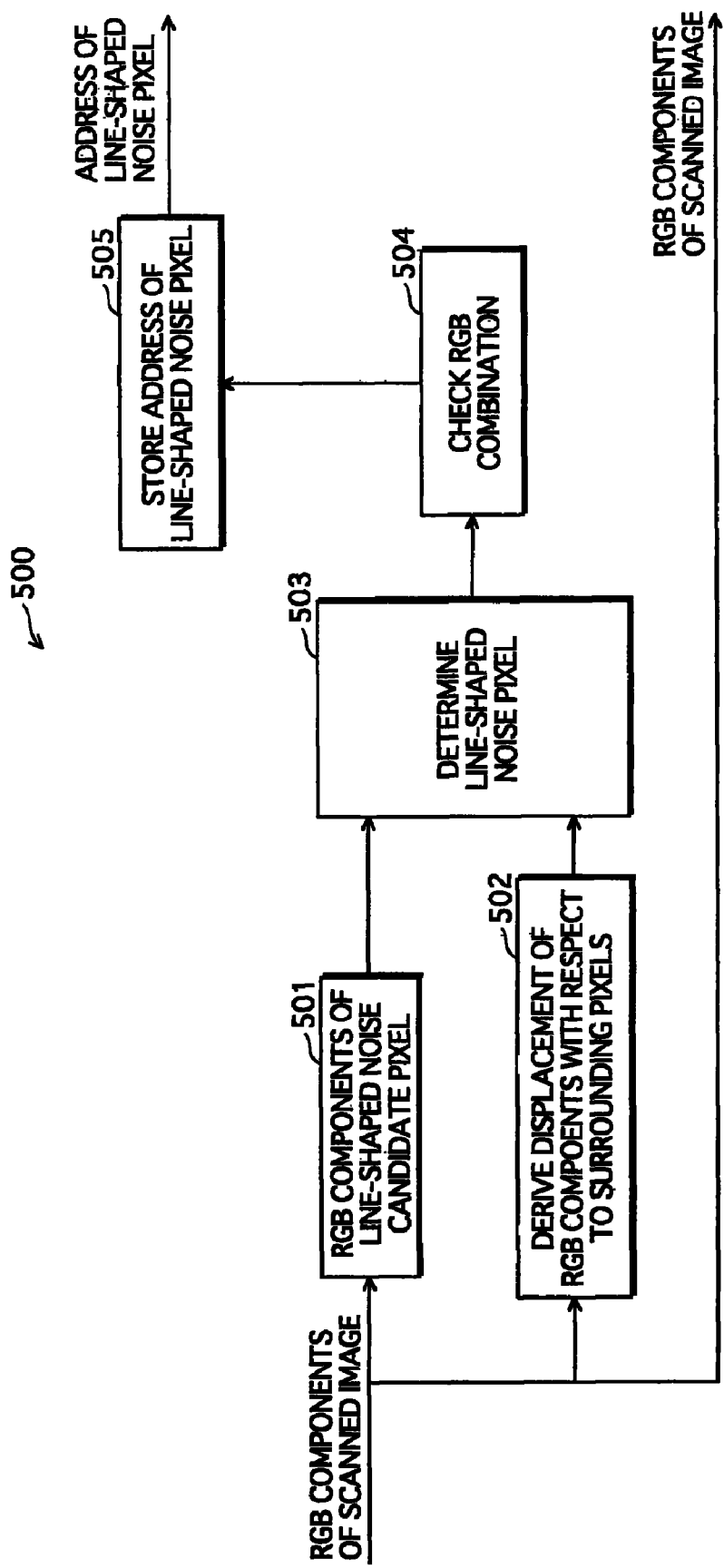
FIG. 4 is a functional block diagram pertaining to line-shaped noise extraction (500)
Figure 5:
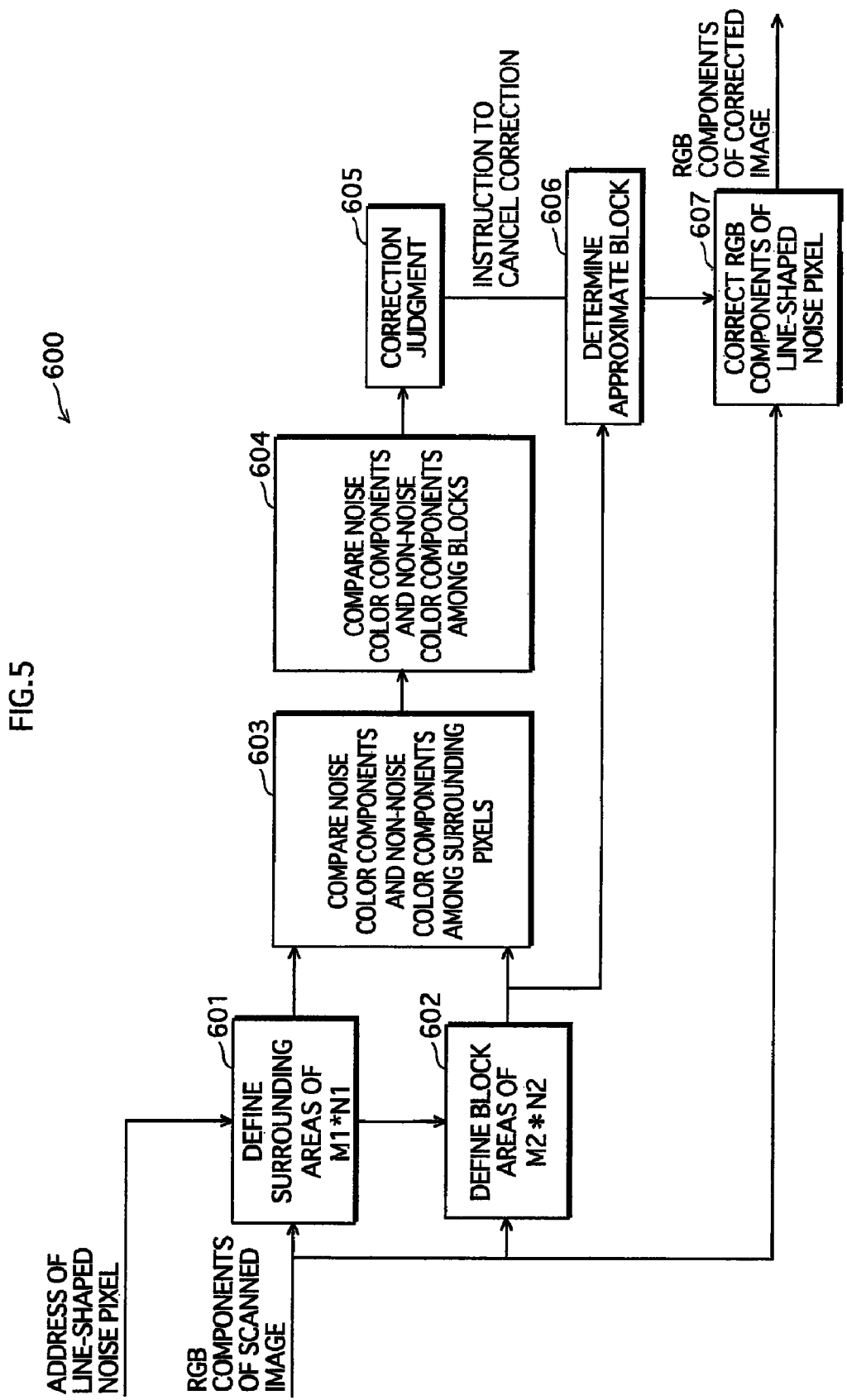
FIG. 5 is a functional block diagram pertaining to line-shaped noise correction (600)

The following explains image processing performed by the image processing unit 48 on the image scanned by the scanner unit 2, with reference to FIG. 3 to FIG. 5.

FIG. 3 is a functional block diagram pertaining to image scanning and image processing.

In the scanner unit 2, the image signal output from the CCD sensor 44 is subjected to CDS (Correlated Double Sampling) processing (100) in order to remove amplification noises and reset noises, subjected to A/D (Analogue to Digital) conversion (200), and sent to the image processing unit 48, as image data showing RGB color components.

In the image processing unit 48, the RGB color components are subjected to shading correction (300) in order to improve evenness in the brightness, and also subjected to coring (400), which is filtering for regarding RGB color components smaller than a prescribed level as "0". Further, line-shaped noise extraction (500) and line-shaped noise correction (600) are performed in order to remove line-shaped noises. Finally, color correction (700) is performed to correct the contrast and the tint. After that, the RGB color components are stored in the RAM (800).

2-1. Line-shaped Noise Extraction

FIG. 4 is a functional block diagram pertaining to the line-shaped noise extraction (500). Upon receiving image data from the scanner unit 2, the image processing unit 48 sequentially chooses a pixel as the target pixel P one by one, and derives difference between the target pixel and the neighboring pixels of the target pixel in the RGB values (densities). The image processing unit 48 extracts line-shaped noise candidate pixels, based on the derived difference (501). Specifically, an edge detection method based on displacement between the pixels is used. This method is commonly used in the technical field of image processing. As a result of the edge detection, if a prescribed number or more pixels extending in the feeding direction of the document sheet are successively detected as edges, the image processing unit stores the addresses of the detected pixels as line-shaped noise candidate pixels into the line-shape noise address storing area 49b of the RAM 49.

The image processing unit 48 selects one by one a target pixel from among the line-shaped noise candidate pixels indicated by the addresses stored in the line-shaped noise address storing area 49b, defines a surrounding area around each target pixel, consisted of a plurality of pixels, and averages the values (densities) of the RGB color components of the pixels included in the surrounding area (hereinafter called "surrounding pixels"). Then the image processing unit 48 compares the RGB values of each target pixel and the averaged RGB values of the surrounding areas to obtain difference between them (502). As a result, if any one of the following conditions is satisfied, the image processing unit 48 judges that the target pixel is a line-shaped noise pixel (503).

Firstly, as FIG. 6A shows, if only one of the RGB values (densities) (e.g. the R value in FIG. 6A) has a difference (displacement) (x1) that is larger than a prescribed value Ref2, and the others of the RGB values (densities) (e.g. the G and B values in FIG. 6A) do not have a difference that is larger than the prescribed value Ref2, the image processing unit 48 judges that the target pixel is a line-shaped noise pixel. This is because it can be assumed that a foreign object has attached to the R component position of the CCD sensor 44 that has read the target pixel.

Secondly, as FIG. 6B shows, if only two of the RGB values (densities) (e.g. the R value and the G value in FIG. 6B) respectively have differences (displacements) that are larger than a prescribed value Ref2, and the difference between the displacements is not greater than a prescribed value Ref3 (i.e. x1 is nearly equal to x2), and the other one of the RGB values (densities) (e.g. the B value in FIG. 6B) does not have a difference (displacement) that is larger than the prescribed value Ref2, the image processing unit 48 judges that the target pixel is a line-shaped noise pixel. This is because it can be assumed that a foreign object has attached to both the R component position and the G component position of the CCD sensor 44 that has read the target pixel. Note that the prescribed value Ref3 is a value that is to be judged as substantially zero (i.e. there is no difference), and the prescribe values Ref2 and Ref3 may be determined in advance according to experimental measurement.

The image processing unit 48 checks whether the combination of the RGB values of the surrounding pixels of the line-shaped noise pixel is appropriate or not (504). Here, the appropriate combination is a combination in which the components other than the component to which a foreign object as the cause of the line-shaped noise is attached are not the same. In other words, a combination in which the components other than the component to which a foreign object is attached are the same is an inappropriate combination.

If the combination is appropriate, the image processing unit 48 stores only the address of the pixel that has been judged as the line-shaped noise pixel into the line-shaped noise address storing area 49b and abandons pixels that have not been judged as the line-shaped noise candidate pixels (505).

Note that in this Specification, a component to which a foreign object as the cause of the line-shaped noise is referred to as "noise color component", and the other component(s) is referred to as "non-noise color component(s)". In the example shown in FIG. 6A, the component R is the noise color component, and the components G and B are the non-noise color components. In the example shown in FIG. 6B, the components R and G are the noise color components, and the component B is the non-noise color component.

The image processing unit 48 determines the line-shaped noise pixels according to the processing procedures described above.

2-2 Line-shaped Noise Correction

Next, FIG. 5 is a functional block diagram pertaining to the line-shaped noise correction (600).

Figure 7A:
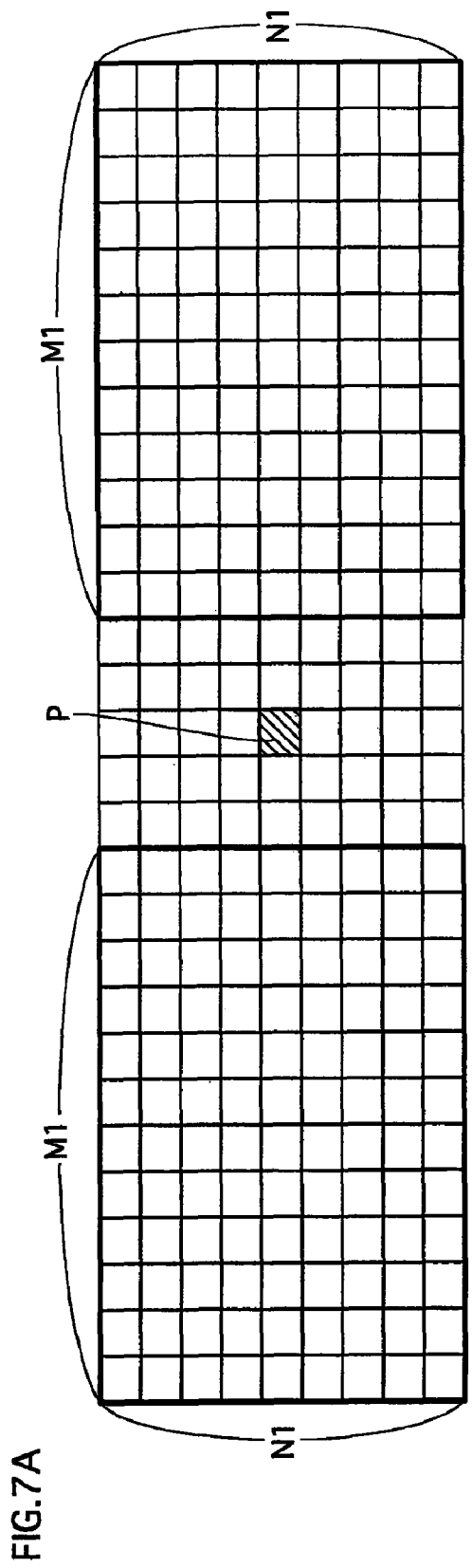
FIG. 7 shows surrounding pixel areas and block areas.

As FIG. 7A shows, the image processing unit 48 selects a target pixel P one by one from the line-shaped noise pixels shown by the addresses stored in the line-shaped noise address storing area 49b, and defines surrounding pixel areas on the both sides of the target pixel P, each consisted of M1*N1 pixels (for example, 12*9 pixels as shown in FIG. 7A) (601).

Figure 7B:
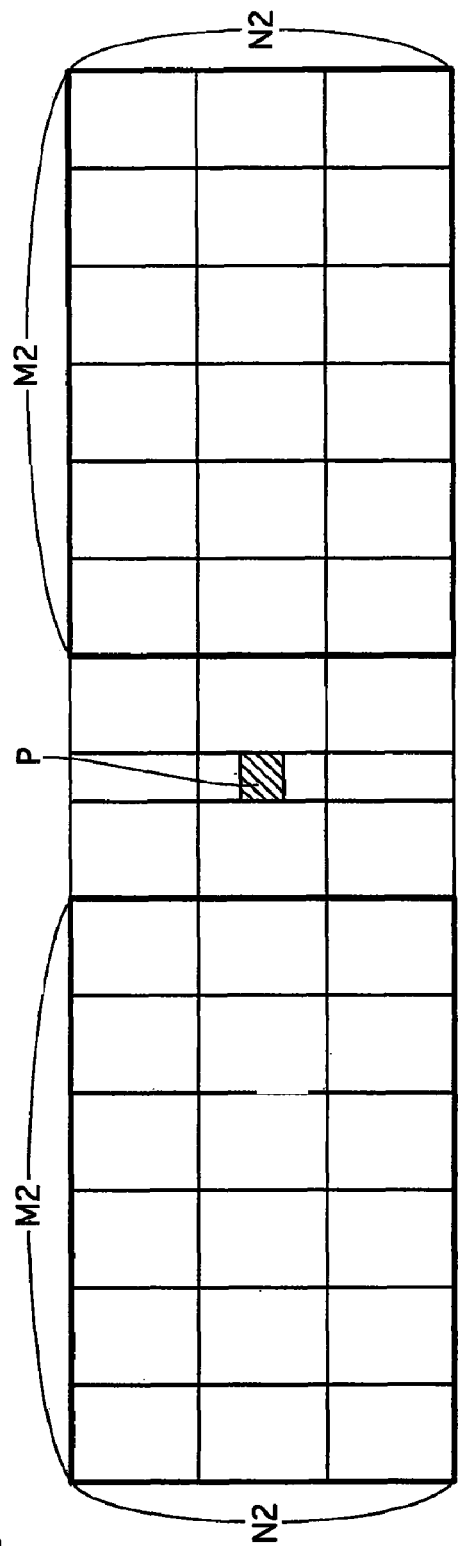

Also, as FIG. 7B shows, the image processing unit 48 combines a plurality of surrounding pixels around the target pixel P (for example, each 2*3 pixels as shown in FIG. 7B), and averages each of RGB color components of the pixels included in each group to define block areas each consisted of M2*N2 blocks (for example, 6*3 blocks in FIG. 7B) (602). After that, the image processing unit 48 determines, as an approximate block, a block whose non-noise color components have values (densities) that are closest in the block areas to the corresponding components of the target pixel P (606). The image processing unit 48 corrects the RGB color components of the target pixel P according to the RGB color components of the approximate block (607).

On the other hand, the image processing unit 48 acquires the RGB values (densities) of all the surrounding pixels, and extracts the smallest value and the greatest value of the noise color component, and the smallest value and the greatest value of the non-noise color component. The image processing unit 48 calculates, as a displacement of the noise color component among the surrounding pixels, the difference between the smallest value and the greatest value of the noise color component. Also, the image processing unit 48 calculates, as a displacement of the non-noise color component among the surrounding pixels, the difference between the smallest value and the greatest value of the non-noise color component (603). In the same manner, the image processing unit 48 acquires the RGB values (densities) of all the block areas, and extracts the smallest value and the greatest value of the noise color component, and the smallest value and the greatest value of the non-noise color component. The image processing unit 48 calculates, as a displacement of the noise color component among the block areas, the difference between the smallest value and the greatest value of the noise color component. Also, the image processing unit 48 calculates, as a displacement of the non-noise color component among the block areas, the difference between the smallest value and the greatest value of the non-noise color component (604).

If the displacement of the noise color component is greater than a prescribed value Ref4 and the displacement of the non-noise color component is not greater than a prescribed value Ref5 as to any of the surrounding pixels and the blocks, the image processing unit 48 prohibits correction of the RGB color components of the target pixel P (605). This is for eliminating the following risk: in the block areas, if there are blocks of which the difference of the non-noise color component is small and the difference of the noise color component is large, any block can be selected as the approximate block, and the target pixel P might be corrected with an inappropriate color depending on the determined approximate block. Note that the prescribed value Ref5 is a value that is to be judged as substantially zero (i.e. there is no difference), and the prescribe values Ref4 and Ref5 may be determined in advance according to experimental measurement.

3. Operations

The following explains flows of the line-shaped noise extraction and the line-shaped noise correction performed by the image processing unit 48 executing the image processing program 50a.

Figure 8:
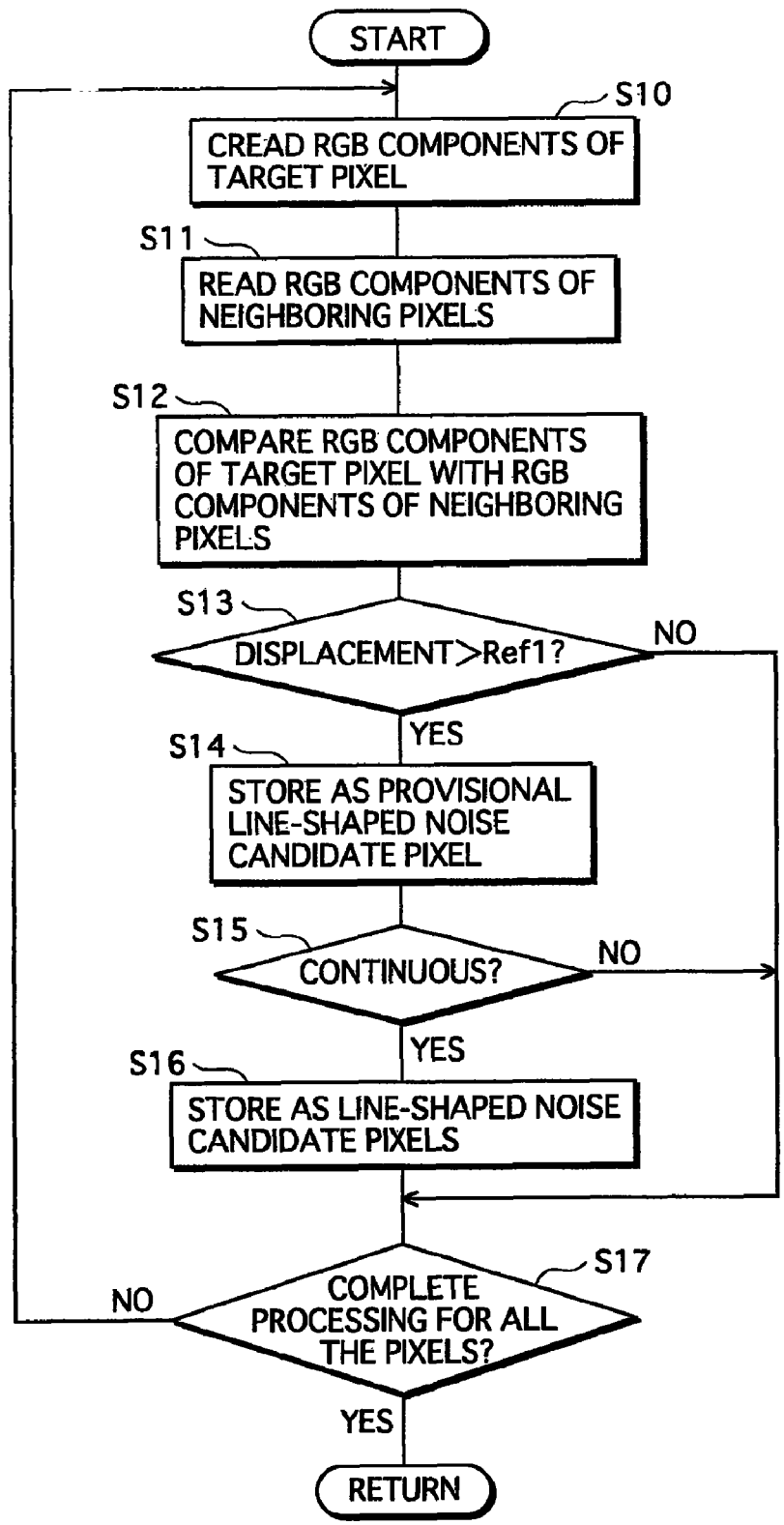
FIG. 8 is a flowchart showing line-shaped noise candidate pixel extraction performed by the copy machine 1.
Figure 9:
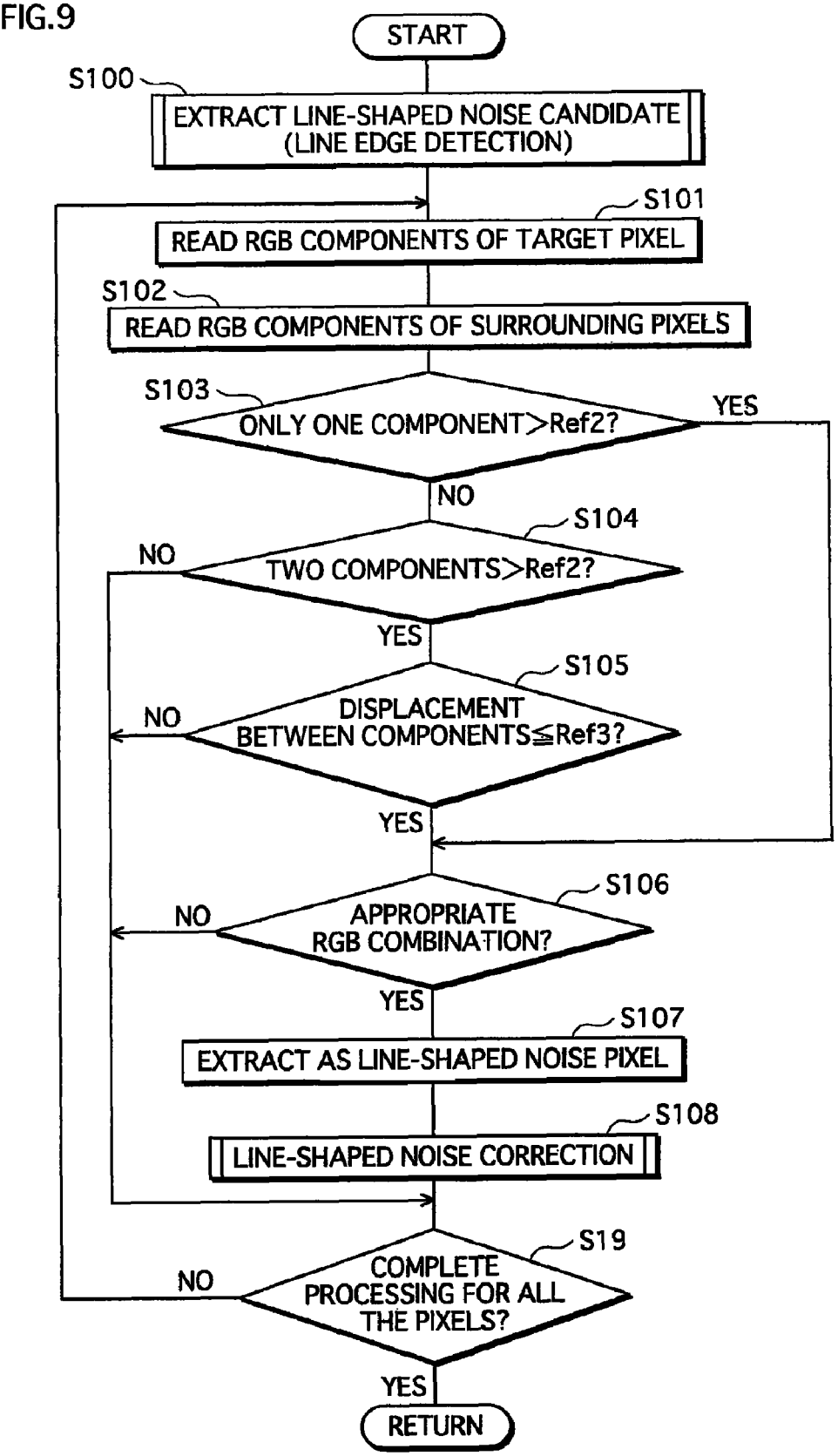
FIG. 9 is a flowchart showing line-shaped noise pixel extraction performed by the copy machine 1.

FIG. 8 and FIG. 9 are flowcharts showing the line-shaped noise extraction.

Figure 10:
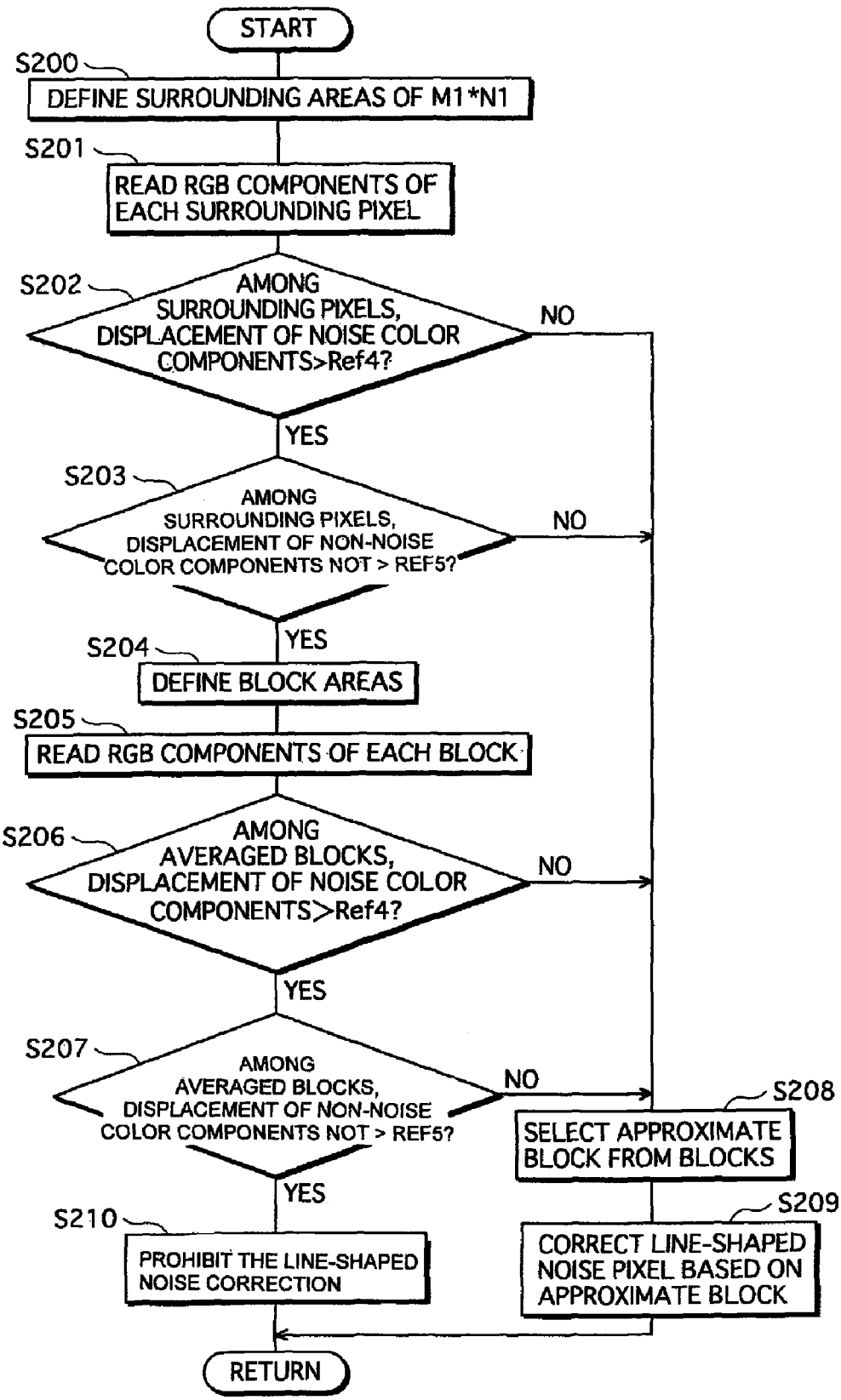
FIG. 10 is a flowchart showing line-shaped noise pixel correction performed by the copy machine 1.

FIG. 10 is a flowchart showing the line-shaped noise correction.

3-1 Line-shaped Noise Extraction

The line-shaped noise correction begins with extraction of line edges (Step S100).

As FIG. 8 shows, the image processing unit 48 sequentially chooses, from among the pixels read by the scanner unit 2, a pixel as the target pixel P one by one, reads the RGB values of the target pixel P (Step S10), and reads the RGB values of neighboring pixels of the target pixel P (Step S11).

The image processing unit 48 compares the RGB values (densities) of the read target pixel and the RGB values of the neighboring pixels of the target pixel (Step S12) to check a difference (Step S13).

If the difference is no less than the prescribed value Ref1 (Step S12: YES), the image processing unit 48 stores the address of the target pixel as a line-shaped noise candidate pixel into the line-shaped noise address storing area 49b (Step S14).

The image processing unit 48 judges the seriality of the line-shaped noise candidate pixels based on whether the number of continuous candidate pixels that have been stored in the line-shaped noise address storing area 49b is no less than a prescribed number (Step S15).

If the line-shaped noise candidate pixels are continuous (Step S15: YES), the image processing unit 48 extracts the continuous pixels as line-shaped noise candidate pixels, and stores the addresses of such pixels into the line-shaped noise address storing area 49b (Step S16).

Upon completing processing of Steps S10-16 for all the pixels read by the scanner unit 2 (Step S17: YES), the image processing unit 48 finishes the extraction of the line-shaped noise candidate pixels.

As FIG. 9 shows, the image processing unit 48 regards each of the pixels indicated by the addresses stored in the line-shaped noise address storing area 49b as a target pixel one by one, reads the RGB values of the target pixel (Step S101), and reads the RGB values of the surrounding pixels of each target pixel and obtains averaged RGB color components by averaging the values (densities) of each component (Step S102). The image processing unit 48 compares the RGB values of the target pixel with the averaged RGB values (Step S103). If only one of the RGB color components has a difference that is greater than the prescribed value Ref2 (Step S103: YES) and if the combination of the RGB color components of the surrounding pixels of the target pixel is appropriate (Step S106: YES), the image processing unit 48 extracts the target pixel as a line-shaped noise pixel, and stores the address of the pixel into the line-shaped noise address storing area 49b (Step S107), and moves to the line-shaped noise correction of the target pixel (Step S108).

If two of the RGB color components respectively have differences that are greater than the prescribed value Ref2 (Step S103: NO, Step S104: YES) and the difference between these two components is no greater than the prescribed value Ref3 (Step S105: YES) and if the combination of the RGB values of the surrounding pixels of the target pixel is appropriate (Step S106: YES), the image processing unit 48 extracts the target pixel as a line-shaped noise pixel, and stores the address of the pixel into the line-shaped noise address storing area 49b (Step S107), and moves to the line-shaped noise correction of the target pixel (Step S108).

If none of the RGB color components has a difference that is greater than the prescribed value Ref2 (Step S103: NO), or if all of the RGB color components respectively have differences that are greater than the prescribed value Ref2 (Step S104: NO), or if two of the RGB color components respectively have differences that are greater than the prescribed value Ref2 but the difference between these two components is greater than the prescribed value Ref3 (Step S105: NO), or if the combination of the RGB values of the surrounding pixels is inappropriate (Step S106: NO), the image processing unit 48 deletes the address of the target pixel from the line-shaped noise address storing area 49b, and does not perform the line-shaped noise correction for this target pixel.

Upon completing processing of Steps S100-S108 for all the line-shaped noise candidate pixels (Step S109: YES), the image processing unit 48 finishes the processing.

3-3 Line-shaped Noise Pixel Correction

As FIG. 10 shows, in the line-shaped noise pixel correction, the image processing unit 48 defines surrounding pixel areas around the target pixel, each consisted of M1*N1 pixels (Step S200), and reads the RGB color components of the surrounding pixels (Step S201).

Among the surrounding pixels, if the displacement of the noise color values (densities) is greater than the prescribed value Ref4 (Step S202: YES) and the displacement of the non-noise color values (densities) is no greater than the prescribed value Ref5 (Step S203: YES), the image processing unit 48 defines block areas each consisted of M2*N2 blocks by averaging RGB values of a prescribed number of surrounding pixels (Step S204), and read the RGB values of each block (Step S205).

Among the blocks, if the displacement of the noise color values (densities) is greater than the prescribed value Ref 4 (Step S206: YES) and the displacement of the non-noise color values (densities) is no greater than the prescribed value Ref5 (Step S207: YES), the image processing unit 48 prohibits the line-shaped noise correction of the target pixel (Step S210).

On the other hand, in the following cases, the image processing unit 48 determines, as an approximate block, a block whose non-noise color components have values (densities) that are closest in the block areas to the corresponding components of the target pixel (Step S208): (i) among the surrounding pixels, the displacement of the noise color values (densities) is no greater than the prescribed value Ref4 (Step S202: NO); (ii) among the surrounding pixels, the displacement of the non-noise color values (densities) is greater than the prescribed value Ref5 (Step S203: NO); (iii) among the blocks, the displacement of the noise color values (densities) is no greater than the prescribed value Ref4 (Step S206: NO); or (iv) among the blocks, the displacement of the non-noise color values (densities) is greater than the prescribed value Ref5 (Step S207: NO). Then the image processing unit 48 corrects the RGV values of the target pixel based on the RGB values of the approximate block (Step S209).

As described above, due to the line-shaped noise extraction and the line-shaped noise correction performed by the image processing unit 48, the copy machine 1 regards, as line-shaped noise pixels, only pixels that are assumed to originally have the same color as the surrounding pixels. Regarding other pixels, the copy machine 1 does not regard them as line-shaped noise pixels as it is highly possible that they are pixels of a long straight line constituting a character, a table, and so on. As a result, the copy machine 1 can avoid misdetection of line-shaped noises.

Also, among the blocks within the surrounding area for the line-shaped noise pixel correction, if the difference of the noise color component is large and the difference of the non-noise color component is small, the copy machine 1 prohibits correcting the RGB color components of the line-shaped noise pixels based on the RGB color components of the blocks. In other words, if the difference of the noise color component is large and the difference of the non-noise color component is small, the color of the line-shaped noise pixel might be changed to a color that is far different from the appropriate color if an inappropriate block is selected. As a result, it is possible to avoid that an image on the document sheet is mistakenly deleted by the correction even if a long straight line constituting a character, a table and so on is misdetected as a line-shaped noise.

Figure 11A:
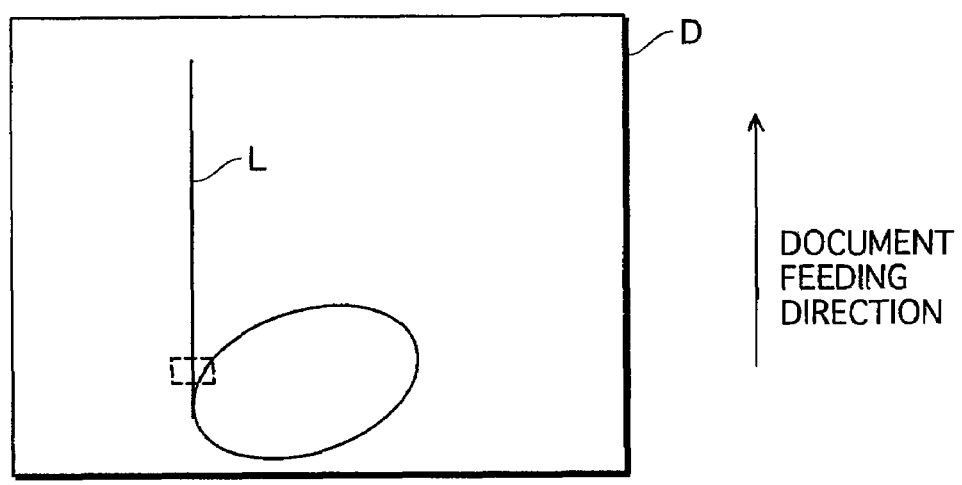
FIG. 11A and FIG. 11B are drawings for explaining effects of the copy machine 1.
Figure 11B:
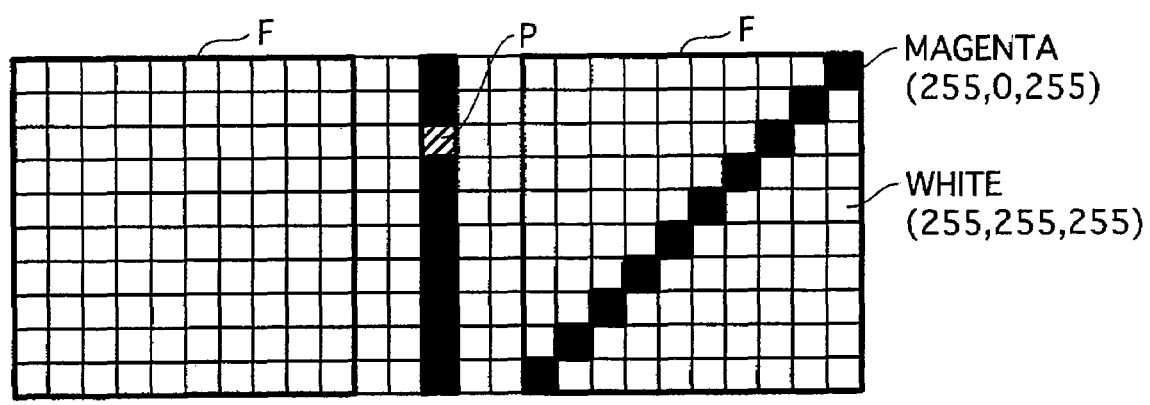

The following describes this effect with reference to FIG. 11A and FIG. 11B. FIG. 11A shows an example case that a letter "b" is illustrated in magenta on a document sheet D and a straight line L that extends in the document sheet feeding direction and constitutes the letter "b" is misdetected as a line-shaped noise. FIG. 11B is an enlarged view of the area illustrated in broken line in FIG. 11A. As FIG. 11B shows, when correcting the target pixel P included in the straight line L, some pixels (or blocks) within the surrounding pixel areas shown by the boldface frame F might have only small differences as to the R component and the B component, such as in the case of white and magenta.

In this case, if the noise component of the target pixel P is the G component, and the non-noise components of the target pixel Pare the R component and the B component, any between the surrounding pixels (or blocks) of white and the surrounding pixels (or blocks) of magenta may be selected for correcting the target pixel P, because the differences as to the R component and the B component respectively are small. There is no problem if the magenta pixels (or blocks) are selected. However, if the white pixels (or blocks) are selected, the color of the straight line L will be changed to an inappropriate color (white) which is far different from the original color. In particular, if the background color is white, the letter will be not recognizable as "b". The copy machine 1 prohibits the correction if the surrounding pixel area includes pixels (or blocks) that have only small differences as to the non-noise color components but significantly different colors, the copy machine 1 prohibits the correction. Therefore, the copy machine 1 can avoid such a problem.

Moreover, in the case where a line-shaped noise is caused on a letter illustrated on the document sheet, the copy machine 1 can avoid that the letter is erased by the correction of the line-shaped noise.

Figure 12A:
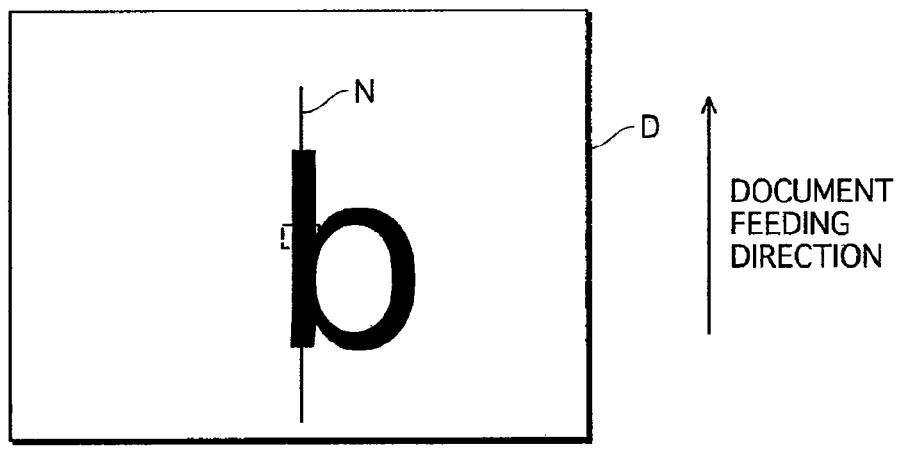
FIG. 12A and FIG. 12B are drawings for explaining effects of the copy machine 1.
Figure 12B:
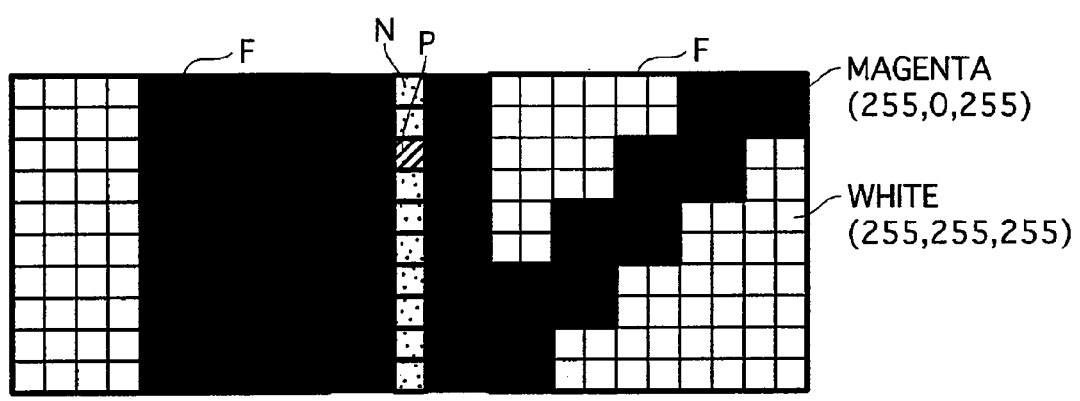

The following describes this effect with reference to FIG. 12A and FIG. 12B. FIG. 12A shows an example case that a letter "b" is illustrated in magenta on a document sheet D and a line-shaped noise N exists on part of the letter "b". FIG. 12B is an enlarged view of the area illustrated in broken line in FIG. 12A. As FIG. 12B shows, when correcting the target pixel P included in the line-shaped noise N, some pixels within the surrounding pixel areas shown by the boldface frame F might have t might have only small differences as to the R component and the B component, such as in the case of white and magenta.

In such a case, if the noise color component of the target pixel P is the G component and the non-noise color components are the R component and the B component, any between the surrounding pixels (or blocks) of white and the surrounding pixels (or blocks) of magenta may be selected for correcting the target pixel P, because the differences as to the R component and the B component respectively are small.

There is no problem if the magenta pixel (or block) is selected. However, if the white pixel (or block) is selected, the color of the straight line changes to an inappropriate color (white) that is significantly different from the original color, and this makes the noise more evident. The copy machine 1 prohibits the correction if the surrounding pixel area includes pixels (or blocks) that have only small differences as to the non-noise color components but significantly different colors, the copy machine 1 prohibits the correction. Therefore, the copy machine 1 can avoid such a problem.

4. Supplemental Explanation (1) In the explanation above, the image processing unit 48 firstly extracts a series of noises and then further extracts line-shaped noise pixels from the candidates (Steps S10-S17 and Steps S100-S109). However, for simplification, the image processing unit 48 may extract the series of noises as the line-shaped noise pixels.

If this is the case, the image processing unit 48 may extract all the series of noises as the line-shaped noise pixels, and performs the line-shaped noise correction on the extracted line-shaped noise pixels (Steps S200-S210).

As a result, the image processing unit 48 does not perform the processing (Steps S100-109) for distinguishing line-shaped noise pixels caused by an attached foreign object and a long straight line constituting a character, a table, and so on. Accordingly, it becomes impossible to prevent misdetection of line-shaped noise pixels. However, even if the straight line is misdetected as a line-shaped noise, it is possible to prevent that an image on the document sheet is erased by the line-shaped noise correction.

(2) The present invention is particularly effective for a sheet-through type image reading apparatus. However, the present invention is applicable to a platen-set type image reading apparatus.

(3) The image processing program 50a may be recorded on and manufactured and distributed in the form of a magnetic tape, a magnetic disk such as a flexible disk, an optical recording medium such as a DVD-ROM, a DVD-R, a DVD+R, a DVD-RAM, a DVD-RW, a DVD+RW, a CD-ROM, a CD-R, a CD-RW, an MO and a PD, a flash memory type recording medium, and various types of computer readable recording medium. Also, the image processing program 40a may be transmitted via a network such as the Internet, broadcasting, a telecommunication network, and a satellite communications.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image reading apparatus comprising:
a reader operable to read an image formed on a sheet to acquire RGB values of pixels that constitute the image, by using a sheet-through method;
an extractor operable to compare an RGB value of each target pixel in the image with an RGB value of a neighboring pixel thereof to judge whether a difference therebetween is no less than a prescribed threshold, and extract the target pixel as a line-shaped noise candidate pixel if the difference is no less than the prescribed threshold and the target pixel constitutes a series of line-shaped noise candidate pixels extending in a feeding direction of the sheet;
a determiner operable to calculate, for each of the R, G and B components included in the RGB value of the line-shaped noise candidate pixel, a difference from the corresponding one of R, G and B components included in an RGB value of each of surrounding pixels included in a surrounding area of the line-shaped noise candidate pixel, and determine the line-shaped noise candidate pixel as a line-shaped noise pixel if (i) only one of the components has a difference that is no less than a prescribed value, or (ii) only two of the components have a difference that is no less than a prescribed value, and the two of the components are considered as substantially the same; and
a corrector operable to correct the RGB value of the line-shaped noise pixel based on an RGB value of at least one of surrounding pixels included in a surrounding area of the line-shaped noise pixel, wherein
the corrector defines a plurality of blocks throughout the surrounding area of the line-shaped noise pixel by averaging R, G and B components among each prescribed number of pixels included in the surrounding area of the line-shaped noise pixel, extracts one of the blocks whose non-noise color component has a smallest difference from a non-noise color component of the line-shaped noise pixel, and corrects the RGB value of the line-shaped noise pixel by replacing with an RGB value of the extracted one of the blocks, where the non-noise color component is any component of the RGB value of the line-shaped noise pixel other than a noise color component, and the noise color component is a component that has the difference that is no less than the prescribed threshold.

2. The image reading apparatus of claim 1, wherein each of the target pixels with the difference no less than the prescribed threshold is a pixel to be detected as an edge.

3. The image reading apparatus of claim 1, wherein from each of (i) RGB values of all the surrounding pixels included in the surrounding area of the line-shaped noise pixel and (ii) RGB values of all the blocks, the corrector extracts a minimum and a maximum of the noise color component and calculates a difference between the minimum and the maximum of the noise color component, and extracts a minimum and a maximum of the non-noise color component and calculates a difference between the minimum and the maximum of the non-noise color component, and the corrector prohibits the correction if the difference between the minimum and the maximum of the noise color component is greater than a first threshold and the difference between the minimum and the maximum of the non-noise color component is not greater than a second threshold with respect to either the blocks or the surrounding pixels included in the surrounding area of the line-shaped noise pixel.

4. An image reading method comprising:
a reading step of reading an image formed on a sheet to acquire RGB values of pixels that constitute the image, by using a sheet-through method;
an extracting step of comparing an RGB value of each target pixel in the image with an RGB value of a neighboring pixel thereof to judge whether a difference therebetween is no less than a prescribed threshold, and extracting the target pixel as a line-shaped noise candidate pixel if the difference is no less than the prescribed threshold and the target pixel constitutes a series of line-shaped noise candidate pixels extending in a feeding direction of the sheet;
a determining step of calculating, for each of the R, G and B components included in the RGB value of the line-shaped noise candidate pixel, a difference from the corresponding one of R, G and B components included in an RGB value of each of surrounding pixels included in a surrounding area of the line-shaped noise candidate pixel, and determining the line-shaped noise candidate pixel as a line-shaped noise pixel if (i) only one of the components has a difference that is no less than a prescribed value, or (ii) only two of the components have a difference that is no less than a prescribed value, and the two of the components are considered as substantially the same; and
a correcting step of correcting the RGB value of the line-shaped noise pixel based on an RGB value of at least one of surrounding pixels included in a surrounding area of the line-shaped noise pixel, wherein
the correcting step defines a plurality of blocks throughout the surrounding area of the line-shaped noise pixel by averaging R, G and B components among each prescribed number of pixels included in the surrounding area of the line-shaped noise pixel, extracts one of the blocks whose non-noise color component has a smallest difference from a non-noise color component of the line-shaped noise pixel, and corrects the RGB value of the line-shaped noise pixel by replacing with an RGB value of the extracted one of the blocks, where the non-noise color component is any component of the RGB value of the line-shaped noise pixel other than a noise color component, and the noise color component is a component that has the difference that is no less than the prescribed threshold.

5. The image reading method of claim 4, wherein each of the target pixels with the difference no less than the prescribed threshold is a pixel to be detected as an edge.

6. The image reading method of claim 4, wherein in the correcting step, from each of (i) RGB values of all the surrounding pixels included in the surrounding area of the line-shaped noise pixel and (ii) RGB values of all the blocks, a minimum and a maximum of the noise color component are extracted and a difference between the minimum and the maximum of the noise color component is calculated, and a minimum and a maximum of the non-noise color component are extracted and a difference between the minimum and the maximum of the non-noise color component is calculated, and in the correcting step, the correction is prohibited if the difference between the minimum and the maximum of the noise color component is greater than a first threshold and the difference between the minimum and the maximum of the non-noise color component is not greater than a second threshold with respect to either the blocks or the surrounding pixels included in the surrounding area of the line-shaped noise pixel.

7. An image reading apparatus comprising:
a reader operable to read an image formed on a sheet to acquire RGB values of pixels that constitute the image, by using a sheet-through method;
an extractor operable to compare an RGB value of each target pixel in the image with an RGB value of a neighboring pixel thereof to judge whether a difference therebetween is no less than a prescribed threshold, and extract the target pixel as a line-shaped noise pixel if the difference is no less than the prescribed threshold and the target pixel constitutes a series of line-shaped noise pixels extending in a feeding direction of the sheet;
a corrector operable to define a plurality of blocks throughout a surrounding area of the line-shaped noise pixel by averaging R, G and B components among each prescribed number of pixels included in the surrounding area, extracts one of the blocks whose non-noise color component has a smallest difference from a non-noise color component of the line-shaped noise pixel, and corrects the RGB value of the line-shaped noise pixel by replacing with an RGB value of the extracted one of the blocks, where the non-noise color component is any component of the RGB value of the line-shaped noise pixel other than a noise color component, and the noise color component is a component that has the difference that is no less than the prescribed threshold; and
a correction prohibiter operable to extract, from RGB components of all the surrounding pixels, a minimum and a maximum of the noise color component, calculate a difference between the minimum and the maximum of the noise color component among the surrounding pixels, extract a minimum and a maximum of the non-noise color component, and calculate a difference between the minimum and the maximum of the non-noise color component among the surrounding pixels, and
extract, from RGB values of all the blocks, a minimum and a maximum of the noise color component and calculate a difference between the minimum and the maximum of the noise color component among the blocks, extract a minimum and a maximum of the non-noise color component, and calculate a difference between the minimum and the maximum of the non-noise color component among the blocks, and
prohibit the correction if the difference between the minimum and the maximum of the noise color component is greater than a first threshold and the difference between the minimum and the maximum of the non-noise color component is not greater than a second threshold with respect to either the surrounding pixels or the blocks.

8. An image reading method comprising:
a reading step of reading an image formed on a sheet to acquire RGB values of pixels that constitute the image, by using a sheet-through method;
an extracting step of comparing an RGB value of each target pixel in the image with an RGB value of a neighboring pixel thereof to judge whether a difference therebetween is no less than a prescribed threshold, and extracting the target pixel as a line-shaped noise pixel if the difference is no less than the prescribed threshold and the target pixel constitutes a series of line-shaped noise pixels extending in a feeding direction of the sheet;
a correcting step of defining a plurality of blocks throughout a surrounding area of the line-shaped noise pixel by averaging R, G and B components among each prescribed number of pixels included in the surrounding area, extracting one of the blocks whose non-noise color component has a smallest difference from a non-noise color component of the line-shaped noise pixel, and correcting the RGB value of the line-shaped noise pixel by replacing with an RGB value of the extracted one of the blocks, where the non-noise color component is any component of the RGB value of the line-shaped noise pixel other than a noise color component, and the noise color component is a component that has the difference that is no less than the prescribed threshold; and
a correction prohibiting step of extracting, from RGB components of all the surrounding pixels, a minimum and a maximum of the noise color component, calculating a difference between the minimum and the maximum of the noise color component among the surrounding pixels, extracting a minimum and a maximum of the non-noise color component, and calculating a difference between the minimum and the maximum of the non-noise color component among the surrounding pixels, and
extracting, from RGB values of all the blocks, a minimum and a maximum of the noise color component and calculating a difference between the minimum and the maximum of the noise color component among the blocks, extracting a minimum and a maximum of the non-noise color component, and calculating a difference between the minimum and the maximum of the non-noise color component among the blocks, and
prohibiting the correction if the difference between the minimum and the maximum of the noise color component is greater than a first threshold and the difference between the minimum and the maximum of the non-noise color component is not greater than a second threshold with respect to either the surrounding pixels or the blocks.

* * * * *